Nov. 24, 1936. R. E. SMITH 2,062,195
POWER TAKE-OFF MECHANISM
Filed Aug. 7, 1934
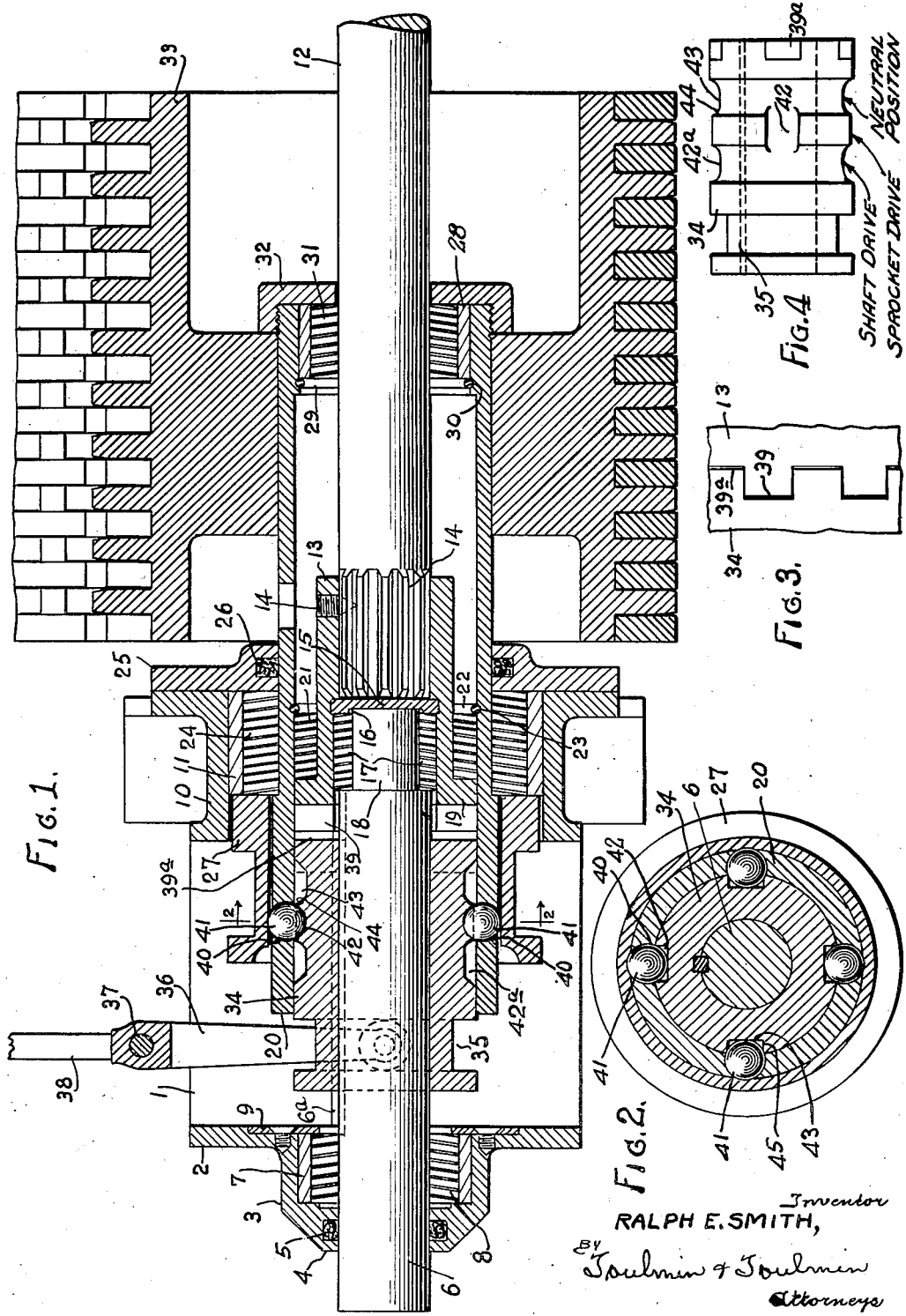
Inventor
RALPH E. SMITH,
By Toulmin & Toulmin
Attorneys Patented Nov. 24, 1936

2,062,195

UNITED STATES PATENT OFFICE 2,062,195

POWER TAKE-OFF MECHANISM

Ralph E. Smith, Galion, Ohio, assignor to The Galion Metallic Vault Company, Galion, Ohio, a corporation of Ohio Application August 7, 1934, Serial No. 738,841

12 Claims. (Cl. 74—11)

This invention relates to improvements in power take-off mechanism, and has for its object to provide, in connection with a plurality of concentrically arranged shafts, means to operatively connect one of said shafts to each of the other of the plurality of shafts for operating the shafts.

It is an object of this invention to provide, in connection with a power shaft, an aligned driven shaft and a hollow driven shaft partly inclosing the first-named driven shaft and the power shaft so that each driven shaft may be selectively operated by the power shaft.

It is also an object of this invention to provide, in connection with a supporting frame, a driven shaft rotatably supported by the frame, a second driven shaft rotatably supported by the first-named driven shaft, and a power shaft rotatably supported by the last-named driven shaft and so connected to each driven shaft that it may operate each one selectively.

It is also an object to provide, in connection with a power shaft, a plurality of driven shafts, with means on the power shaft and within one of the driven shafts for operatively connecting the power shaft to either of the driven shafts.

These and other objects and advantages will appear from the following description taken in connection with the drawing.

Referring to the drawing:

Figure 1 is a vertical, longitudinal section through the power take-off mechanism.

Figure 2 is a section on the line 2—2 of Figure 1.

Figure 3 shows part of the clutch mechanism connecting the power shaft and the tail shaft.

Figure 4 is a view of the clutch member, showing the details of the axially-spaced annular grooves and the interconnecting axial grooves defining pockets therebetween.

The power take-off mechanism is adapted to be used in connection with the power shaft of an automotive vehicle and be supported by the frame of the automotive vehicle through the instrumentality of a frame member, suitably attached to the automotive vehicle, said attached frame consisting of side members 1 and an end member 2, having thereon an annular casing 3 provided with an inturned part 4 having packing 5 therein to support and serve as a partial bearing for a power shaft 6.

The annular casing serves as a race-way for roller bearings 8 which are surrounded by a bearing ring 7, of some suitable material. The bearing ring and the rollers are held in position by means of an annular plate or washer 9, and attached to the end member 2 by means of suitable screws. The frame has on its end, opposite the end member, a circular part 10 which has therein a ring-shaped bearing 11.

In alignment with the power shaft 6 is a driven or tail shaft 12 adapted to be connected to the rear axle of an automotive vehicle for propelling purposes. On the forward end of this shaft is a sleeve 13 suitably attached thereto by some instrumentality such as a screw or a spline 14. This sleeve extends beyond the forward end of the tail or driven shaft. Within the sleeve and between the end of the tail or driven shaft and the power shaft 6 is an end thrust disc 15, which rests against a shoulder 16 provided on the interior of the sleeve 13. Within the sleeve are roller bearings 17 for rotatably supporting the rear end of the power shaft and in engagement with a reduced part 18 of the power shaft. The shoulder on the power shaft caused by the reduction to produce the part 18 provides a keeper element for the roller elements.

The forward end of the sleeve 13 is provided with an outwardly radially extending shoulder 19, which is in engagement with the inner surface of a hollow shaft 20 mounted around the adjacent ends of the power shaft 6 and the tail or driven shaft 12. Between the sleeve 13 and the hollow shaft are roller bearings 21, held in position by means of the shoulder 19 and a ring 22 located in a groove 23 in the interior of the hollow shaft. This ring may be made of wire or some other suitable hard steel substance.

Between the hollow shaft 20 and the bearing ring 11 are bearing rollers 24, held in position by an end plate 25 and a ring 27. This end plate 25 has an opening therein to receive the hollow shaft, and is provided with an orifice in which there is a packing 26 in engagement with the hollow shaft. This plate is attached to the part 10 by means of screws, bolts or any other suitable instrumentality. The ring 27 engages the ends of the roller bearings 24 opposite the plate 25, and is located between the hollow shaft and the circular part 10 of the frame.

In the rear end of the hollow shaft 20 is a ring 28 and between this ring and the periphery of the driven or tail shaft 12 are roller bearings 31, held in position by means of a ring 29 located in a groove 30 and a cap 32, suitably positioned over the end of the hollow shaft. This cap 32 and ring 29 serve to provide a race-way for the roller bearings 31. On the rear end of the hollow shaft is a sprocket 33 to which a suitable link belt may be attached for operating any kind of machinery.

Located on the power shaft 6, between the sleeve 13 and the end member 2, is a clutch member 34 adapted to be moved longitudinally on the power shaft and longitudinally within the hollow shaft 20. Around the periphery of this clutch member is a groove 35 in which a yoke 36, pivoted at 37, works. This yoke is operated by means of a handle 38. This handle may be operated directly by hand or it may be connected by links and levers to other operating mechanism, such as a lever located in the cab of the automotive vehicle. The clutch member 34 is provided with clutch jaws 39a adapted to engage similar clutch jaws 39, located on the free end of the sleeve 13. The clutch member is keyed by means of key 6a to power shaft 6 so that it will rotate therewith, but may be freely moved longitudinally thereof so that the clutch jaws 39a and 39 may engage and disengage. When the clutch jaws are in engagement the shaft 12 is rotated from the shaft 6 through the sleeve 13.

In the forward end of the hollow shaft 20 are pockets 40 adapted to receive balls 41. These pockets conform to the shape of the balls and support the balls so they will project into the interior of the hollow shaft 20. For receiving these balls the clutch member 34 is provided with an annular peripheral groove 43 in which these balls may rotate when the clutch member is in neutral position, and an annular groove 42a axially spaced from said first groove in which they may rotate when the clutch jaws 39 and 39a are in engagement. The periphery of the clutch member 34 is also provided with a plurality of pockets 42 defined by axial grooves interconnecting the grooves 42a and 43, one pocket for each ball.

The edges of these pockets 42 that are substantially axially disposed are perpendicular to the bottoms of the pockets 42, while the other edges, that is the edges joining the aforesaid edges with the grooves 42a and 43 and extending substantially annularly of the clutch member, are inclined or cam-shaped, as indicated by the numeral 44. The substantially vertical edges are indicated by the numeral 45. The forward ones of the inclined edges are so arranged that the balls may readily pass from the groove in the clutch member to the pockets. When the balls are in the pockets they serve as clutch members, whereby the hollow shaft will be caused to rotate with the clutch member and the power shaft. When the clutch member is moved to its extreme righthand position, as shown in Figure 1, the power shaft will drive through the clutch member and the sleeve 13 the tail or driven shaft 12. When the clutch member is in the extreme lefthand position, with the balls in the pockets, the power shaft will drive the sprocket through the clutch member 34 and the hollow shaft 20.

I desire to comprehend within my invention such modifications as may be embraced within my claims and the scope of my invention.

Having thus fully described my invention, what I claim as new and desire to secure by Letters Patent, is:

1. In a power take-off, a hollow shaft supported for rotation, a driven shaft having on one end a sleeve, said sleeve being in the hollow shaft and having a shoulder, roller bearings between the sleeve and the hollow shaft, a ring in the hollow shaft cooperating with the shoulder to hold the bearings in place, a power shaft supported at one end by the sleeve, and means to connect the power shaft to either the hollow shaft or to the driven shaft, said means comprising a member adapted to have a clutching connection with the sleeve and a ball pocket connection with the hollow shaft.

2. In a power take-off, a casing, a power shaft, a driven shaft having thereon a sleeve defining an end recess, a hollow shaft surrounding said driven shaft, said shafts being substantially coaxial with one another, a bearing in said end recess arranged to receive the end of said power shaft, a bearing between said driven shaft and said hollow shaft and a bearing between said hollow shaft and said casing, said bearings lying at least partially in substantially the same transverse plane, and means to selectively connect said power shaft to said hollow shaft or to said driven shaft and/or to disconnect it from both simultaneously, said means comprising a sliding member on the drive shaft adapted to have a clutching connection with the driven shaft and a ball-pocket connection with the hollow shaft.

3. In a power take-off, a casing, a power shaft, a driven shaft, a hollow shaft surrounding said driven shaft, and a slider mounted on said power shaft for communicating power selectively from said power shaft to said driven shaft or to said hollow shaft, said slider having clutch portions adapted to engage corresponding clutch portions on one of said shafts and having ball and pocket connections for transmitting power to the other of said shafts from said power shaft.

4. In a power take-off, a casing, a power shaft, a driven shaft, a hollow shaft surrounding said driven shaft, and a slider mounted on said power shaft for communicating power selectively from said power shaft to said driven shaft or to said hollow shaft, said driven shaft having clutch teeth and said slider having corresponding clutch teeth engageable therewith in one position of said slider, said slider having a plurality of longitudinal pockets in the periphery thereof, said hollow shaft having a plurality of pockets substantially adjacent said slider pockets and a ball in each pocket adapted to interconnect said hollow shaft and said slider.

5. In a power take-off, a casing, a power shaft, a driven shaft, a hollow shaft surrounding said driven shaft, and a slider mounted on said power shaft for communicating power selectively from said power shaft to said driven shaft or to said hollow shaft, said driven shaft having clutch teeth and said slider having corresponding clutch teeth engageable therewith in one position of said slider, said slider having a plurality of longitudinal pockets in the periphery thereof, said hollow shaft having a plurality of pockets substantially adjacent said slider pockets and a ball in each pocket adapted to interconnect said hollow shaft and said slider, said slider having an annular groove therearound for providing a free rotation of said slider relatively to said hollow shaft.

6. In a power take-off device comprising a drive shaft and two driven shafts independently rotatable and arranged coaxially with respect to the drive shaft and one within the other, the outer of said driven shafts having a plurality of balls arranged in spaced pockets therein, and said drive shaft having means rotatable therewith and slidable thereon to selectively connect said drive shaft with either of said driven shafts; said last-named means comprising a substantially cylindrical member having clutch teeth on one end thereof and having on its periphery two spaced annular grooves connected by spaced axial grooves defining pockets, said grooves being engageable by said balls, whereby by sliding the cylindrical member on the drive shaft, said balls may be selectively engaged with either annular groove to disconnect said drive shaft and said outer driven shaft and with said pockets to operatively connect said drive shaft with said outer driven shaft.

7. In a power take-off device comprising a drive shaft and two driven shafts independently rotatable and arranged coaxially with respect to the drive shaft and one within the other, the outer of said driven shafts having a plurality of balls arranged in spaced pockets therein and said drive shaft having means rotatable therewith and slidable thereon to selectively connect said drive shaft with either of said driven shafts and/or disconnect said drive shaft from both driven shafts simultaneously; said last-named means comprising a substantially cylindrical member having clutch teeth on one end thereof and having on its periphery two axially-spaced annular grooves connected by spaced axial grooves defining pockets, said grooves being engaged by said balls, whereby by sliding the cylindrical member on the drive shaft, said balls may be selectively engaged with one of said annular grooves to disconnect said drive shaft and said outer driven shaft and connect said drive shaft and said other driven shaft, and with said pockets to operatively connect said drive shaft with said outer driven shaft and with the other of said grooves to disconnect the drive shaft from both driven shafts.

8. In a power take-off device comprising a drive shaft and two driven shafts independently rotatable and arranged coaxially with respect to the drive shaft and one within the other, the outer of said driven shafts having a plurality of balls arranged in spaced pockets therein and the inner thereof having axially-extending jaws at one end thereof and said drive shaft having means rotatable therewith and slidable thereon to selectively connect said drive shaft with either of said driven shafts and/or disconnect said drive shaft from both driven shafts simultaneously; said last-named means comprising a substantially cylindrical member having on its periphery two spaced annular grooves connected by spaced axial grooves defining pockets, all of said grooves being engageable with said balls, said member having axially disposed jaws on one end thereof engageable with the jaws on said inner driven shafts whereby, by sliding the cylindrical member on the drive shaft, said balls may be selectively engaged with one of said annular grooves to disconnect the drive shaft from both of said driven shafts, with the pockets to connect the drive shaft with said outer driven shaft, or with the other annular groove to disconnect said drive shaft from said outer driven shaft and connect it, by engagement of the jaws on the cylindrical member and on the inner driven shaft, with said inner driven shaft.

9. As an article of manufacture, a clutch shifter adapted to transmit power selectively from a drive shaft to either of two driven shafts comprising a substantially cylindrical member having on the periphery thereof ball receiving and retaining channelway means comprising two axially-spaced annular grooves connected by spaced axially-extending grooves, said last-named grooves defining pockets cooperating with ball means to form a power connection.

10. As an article of manufacture, a clutch shifter adapted to transmit power selectively from a drive shaft to either of two driven shafts comprising a substantially cylindrical member having on the periphery thereof ball receiving and retaining channelway means comprising a plurality of axially-extending, radially-spaced pockets connected at each end by axially-spaced annular grooves cooperating with ball means to form a drive connection for one of said driven shafts, said cylindrical member having jaws at one end thereof to provide a driving connection for said other driven shaft.

11. As an article of manufacture, a clutch shifter comprising a substantially cylindrical member having on the periphery thereof ball receiving channelway means adapted to cooperate with a plurality of balls to form a selectively operable drive connection, said means comprising a plurality of axially-extending, radially-spaced pockets connected at each end by axially-spaced annular grooves, said grooves and pockets being of substantially the same depth.

12. As an article of manufacture, a clutch shifter adapted to selectively connect a drive shaft to either of two driven shafts comprising a substantially cylindrical member having axially disposed end jaws and having on the periphery thereof a plurality of axially-extending, radially-spaced pockets connected at each end by axially-spaced annular grooves, said grooves and said pockets being of substantially the same width and depth and being adapted to receive and retain a plurality of balls and cooperate therewith to form a drive connection for one of said driven shafts, said jaws providing a drive connection for the other of said driven shafts.

RALPH E. SMITH.